(12) United States Patent
Weber et al.

(10) Patent No.: US 6,330,225 B1
(45) Date of Patent: Dec. 11, 2001

(54) COMMUNICATION SYSTEM AND METHOD FOR DIFFERENT QUALITY OF SERVICE GUARANTEES FOR DIFFERENT DATA FLOWS

(75) Inventors: Wolf-Dietrich Weber, San Jose; Richard Aras, San Francisco; Drew E. Wingard, San Carlos, all of CA (US)

(73) Assignee: Sonics, Inc., Mountain View, CA (US)

( * ) Notice: Subject to any disclaimer, the term of this patent is extended or adjusted under 35 U.S.C. 154(b) by 0 days.

(21) Appl. No.: 09/580,031

(22) Filed: May 26, 2000

(51) Int. Cl.[7] ....................................... H04J 3/16
(52) U.S. Cl. ......................... 370/231; 370/235; 370/468
(58) Field of Search .................... 370/230, 231, 370/232, 233, 234, 235, 236, 238, 395, 394, 464, 465, 466, 467, 468, 503

(56) References Cited

U.S. PATENT DOCUMENTS

| | | | | |
|---|---|---|---|---|
| 5,469,433 | * | 11/1995 | McAuley | 370/230 |
| 6,141,355 | * | 10/2000 | Palmer et al. | 370/465 |
| 6,198,724 | * | 3/2001 | Lam et al. | 370/233 |
| 6,215,789 | * | 4/2001 | Keenan et al. | 370/399 |
| 6,216,797 | * | 4/2001 | Fellman et al. | 370/503 |

* cited by examiner

*Primary Examiner*—Ricky Ngo
(74) *Attorney, Agent, or Firm*—Blakely, Sokoloff, Taylor & Zafman LLP

(57) ABSTRACT

A system and method for providing service guarantees for data flows between an initiator component and a target component. For each data flow, a set of channels is selected to carry the data flow from initiator to target. The individual performance guarantees of the selected channels are aligned to be uniform in units and the individual guarantees are aggregated to provide an end-to-end service guarantee for a particular flow.

36 Claims, 5 Drawing Sheets

MEMORY SYSTEM QUALITY OF SERVICE GUARANTEES FOR 8 BYTE READ OR WRITE REQUESTS

|  | CHANNEL 1 | CHANNEL 2 | CHANNEL 3 |
|---|---|---|---|
| MINIMUM BANDWIDTH | 10 M REQ/S | 10 M REQ/S | 10 M REQ/S |
| MAXIMUM LATENCY | 100 NS | 200 NS | 200 NS |

COMMUNICATION SUBSYSTEM QUALITY OF SERVICE GUARANTEES

|  | CHANNEL A (PORT X INCOMING CHANNEL 1 TO PORT Z OUTGOING CHANNEL 1) | CHANNEL B (PORT X INCOMING CHANNEL 2 TO PORT Z OUTGOING CHANNEL 2) | CHANNEL C (PORT Y INCOMING CHANNEL 1 TO PORT Z OUTGOING CHANNEL 3) |
|---|---|---|---|
| MINIMUM BANDWIDTH | (NONE) | 4 BYTES IN 4 CYCLES | 4 BYTES IN 2 CYCLES |
| MAXIMUM LATENCY | (NONE) | 3 CYCLES EACH WAY | 5 CYCLES EACH WAY |

| INITIATOR REQUEST SIZE | MEMORY SYSTEM (CHANNEL 1) | COMMUNICATION SUBSYSTEM (100 MHZ) CHANNEL B |
|---|---|---|
| 4 BYTES | 40 MBYTES/S | 100 MBYTES/S |
| 8 BYTES | 80 MBYTES/S | 100 MBYTES/S |
| 16 BYTES | 80 MBYTES/S | 100 MBYTES/S |

DATA FLOW MAPPING

INITIATOR A FLOW 1,
INTERFACE 1 CHANNEL A,
COMMUNICATION
SUBSYSTEM CHANNEL B,
INTERFACE 3 CHANNEL A,
TARGET C CHANNEL 1

INITIATOR A FLOW 2,
INTERFACE 1 CHANNEL B,
COMMUNICATION
SUBSYSTEM CHANNEL A,
INTERFACE 3 CHANNEL B,
TARGET C CHANNEL 3

INITIATOR B FLOW 1,
INTERFACE 2 CHANNEL A,
COMMUNICATION
SUBSYSTEM CHANNEL C,
INTERFACE 3 CHANNEL C,
TARGET C CHANNEL 2

---

QUALITY OF SERVICE GUARANTEES AFTER UNIT CONVERSION

|  |  | COMM. SUBSYSTEM (100 MHZ FREQ.) | MEMORY SYSTEM |
|---|---|---|---|
| INITIATOR A FLOW 1 (4 BYTE REQUESTS) | MAX BANDWIDTH MIN LATENCY | 100 MBYTES/S 60 NS | 40 MBYTES/S 100 NS |
| INITIATOR A FLOW 2 (16 BYTE REQUESTS) | MAX BANDWIDTH MIN LATENCY | (NONE) (NONE) | 80 MBYTES/S 200 NS |
| INITIATOR B FLOW 1 (8 BYTE REQUESTS) | MAX BANDWIDTH MIN LATENCY | 200 MBYTES/S 100 NS | 80 MBYTES/S 200 NS |

---

SYSTEM WIDE QUALITY OF SERVICE GUARANTEES

| INITIATOR A FLOW 1 (4 BYTE REQUESTS) | MAX BANDWIDTH MIN LATENCY | 40 MBYTES/S 160 NS |
|---|---|---|
| INITIATOR A FLOW 2 (16 BYTE REQUESTS) | MAX BANDWIDTH MIN LATENCY | (NONE) (NONE) |
| INITIATOR B FLOW 1 (8 BYTE REQUESTS) | MAX BANDWIDTH MIN LATENCY | 80 MBYTES/S 300 NS |

FIG. 8

COMMUNICATION SYSTEM AND METHOD FOR DIFFERENT QUALITY OF SERVICE GUARANTEES FOR DIFFERENT DATA FLOWS

FIELD OF THE INVENTION

The present invention relates to a communications system to couple computing subsystems.

BACKGROUND OF INVENTION

Electronic computing and communication systems continue to include a greater number of features and to increase in complexity. At the same time, electronic computing and communications systems tend to decrease in physical size and cost per function.

Rapid advances in semiconductor technology have enabled true "system-on-a-chip" designs. These complex designs may incorporate, for example, one or more processor cores, a digital signal processing core, several communications interfaces, and graphics support in application-specific logic. These extremely complex subsystems must communicate with one another. Significant new challenges arise in the integration, verification, and testing of such systems because efficient communication must take place between subsystems on a single complex chip as well as between chips on a system board.

One way to achieve efficient communication is to have a separate communication subsystem with individual functional blocks tying into the communication subsystem via a well-specified standard interface. One benefit of having a well-defined separation of the communication subsystem is that the functional blocks can be reused in other systems with a minimum of redesign.

One challenge in the integration, verification, and testing of modern electronic systems stems from the fact that modern electronic systems in many application areas have functionality, cost, and form-factor requirements that mandate the sharing of resources among multiple functional blocks. Examples of such shared resources are processors, memory and the communication subsystem itself. In such systems, the functional blocks typically possess different performance characteristics and requirements, and the communications system and shared resources must simultaneously satisfy total requirements in order for the entire system to meet its performance specifications. Different data flows between different functional blocks in the system have different performance requirements. Key requirements of such data flows are bandwidth and latency, and these can vary over several orders of magnitude between different data flows. Different data flows thus impose different quality-of-service requirements on the functional blocks and communications subsystem.

The traditional approach to the problem of meeting system requirements in the face of diverse quality-of-service requirements for different data flows has been to overdesign the shared resources or to provide dedicated resources for different data flows. For example, instead of designing a communications subsystem that can provide differential quality of service to three different data flows involving the memory system, designers instead build three separate communications systems to three separate ports of the memory system. While meeting the required performance characteristics, this design style may also make the system too large or too costly to be practical.

Another problem with today's approaches to designing systems with diverse quality of service requirements is that the methods employed do not lend themselves to analysis prior to actual implementation. Systems are built and then simulated to measure the attained performance of different data flows under different conditions. The result is that the designer can never be sure that the performance requirements are met under all conditions, since it is typically impractical to simulate the entire system under all possible conditions.

What is needed is a methodology for designing and integrating functional blocks and communication subsystems that yields a system with predictable and differential quality of service guarantees for different data flows while at the same time minimizing the size and cost of the components and the entire system.

SUMMARY OF THE INVENTION

The present invention achieves predictable system-wide differential quality of service guarantees for different data flows using a methodology of requiring individual components (e.g., functional blocks, communication subsystems, and the interfaces between them) to provide quality of service guarantees on different data channels and then aggregating these component guarantees into system-wide guarantees.

Given a set of components that each give different quality of service guarantees on different data channels, components are composed into a system. In one embodiment, the system-wide data flows are mapped to the data channels provided by each component. The quality of service guarantees given by each component are aligned or translated into a common set of units for the entire system. The individual quality of service guarantees are aggregated to yield system-wide quality of service guarantees for each individual data flow.

BRIEF DESCRIPTION OF THE DRAWINGS

The objects, features and advantages of the present invention will be apparent from the following detailed description in which

FIG. 8 illustrates one example of how the composition methodology is applied to the system of FIG. 7 to obtain the end-to-end quality of service guarantees.

DETAILED DESCRIPTION

The system and method of the present invention provide predictable system-wide quality of service guarantees for different data flows. In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figures 1, 2A:
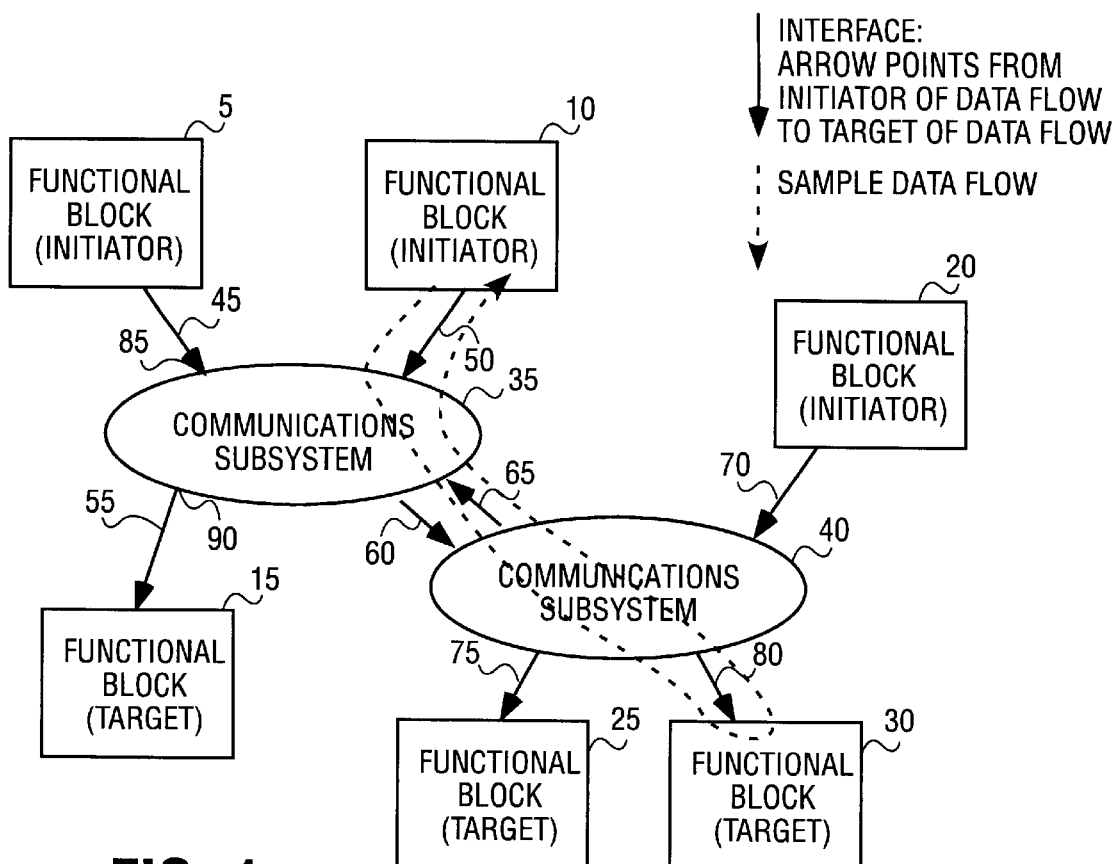
FIG. 1 shows an exemplary system consisting of three initiator functional blocks, three target functional blocks, and two communication subsystems that are tied together using a set of interfaces.
FIGS. 2a and 2b show examples of a functional block's quality of service guarantees, and a communication subsystem's quality of service guarantees.

An exemplary system is shown in FIG. 1. The system consists of one or more functional blocks 5, 10, 15, 20, 25, 30 and one or more communication subsystems 35, 40 that are all tied together using a set of interfaces 45, 50, 55, 60, 65, 70, 75, 80. The functional blocks 5, 10, 15, 20, 25, 30 perform the actual work done by the system (such as computation). In this document, the focus is on communication between functional blocks. Functional blocks are broken down into initiators 5, 10, 20 and targets 15, 25, 30, depending on whether a functional block initiates or is the target of a data flow.

For purpose of discussion herein, a data flow is a set of commands, data items or events being communicated over time between two functional blocks. Any given request from an initiator to a target is a request to perform some action. For example, read and write requests cause a target to retrieve and store the data respectively. A channel is a portion of a set of physical resources in a component that is dedicated to service a particular data flow. For example, a target may have different data channels to service different incoming data flows. A communication subsystem transmits data items from one of its input ports to an output port, using a dedicated data channel for each data flow. Each of the ports leads from/to another communications subsystem or a functional block via an interface. Interfaces also have dedicated channels for each data flow.

Thus, for example, the end-to-end progress of a data flow may be as follows. The data flow originates at an initiator. It travels to an input port of a first communication subsystem via a channel of an interface. Once inside the first communication subsystem, it travels to an output port, via a channel. It then may cross another interface to other communication subsystems until it finally reaches a target. It is serviced by a dedicated channel inside the target and completes if no response is needed. If a response is needed, the data flow then reverses its direction through the communications subsystem(s), and completes when it reaches the originating initiator.

In one embodiment, the interfaces tying the different components together have the ability to tag each request and response transmitted with the identity of the channel it belongs to, and the ability to transmit flow control on a per-channel basis. These features of the interfaces are desirable to achieve independent data channels that allow the quality of service guarantees given by an individual component to be propagated to another component that it is connected to via an interface.

FIG. 2a shows an example of a functional block's quality of service guarantees. In this case, a memory system is shown that has differential quality of service guarantees for three channels. The quality of service guarantees given are minimum bandwidth and maximum latency while servicing an 8-byte read or write request. In this example, each channel can sustain 10 M 8-byte requests per second. Channel 1 has been optimized for lower latency and guarantees a maximum service latency of 100 ns, while channels 2 and 3 only guarantee a maximum service latency of 200 ns. It is common for the performance guarantees given by a particular functional block to be much more complex than shown here and to depend on a lot of different factors such as request size, inter-arrival interval, etc. The metrics used here have been chosen to keep the example simple. While maximum latency and minimum bandwidth are two common types of performance parameters, quality of service guarantees using other parameters such as, maximum outstanding requests, maximum variance in service latency, etc. are equally possible. In addition, if a particular component is too complex to easily achieve differential quality of service guarantees, the methodology can be applied recursively to that component by breaking it down into smaller, more manageable pieces.

Figures 2B, 3:
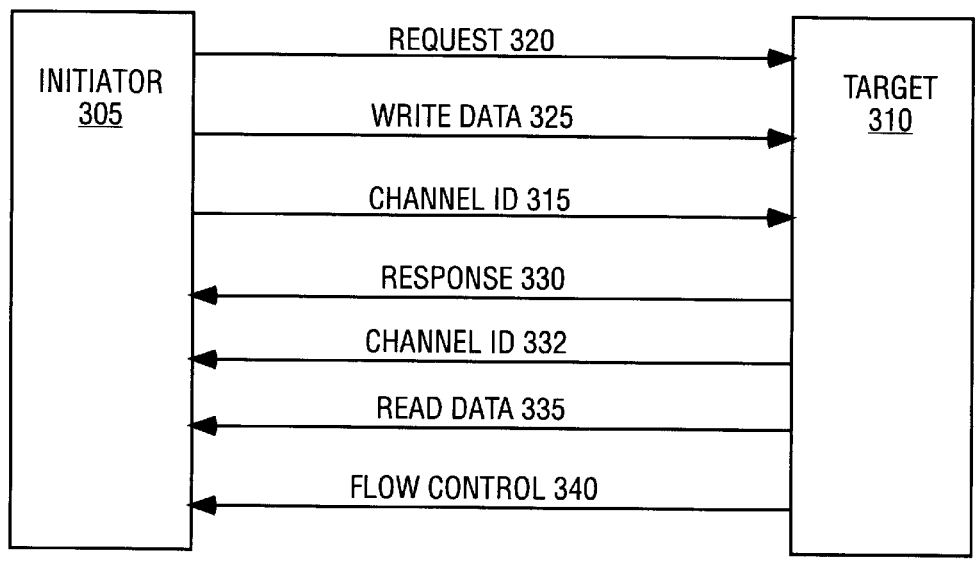
FIG. 3 shows an example interface that has both channel identification and per-channel flow-control signals.

FIG. 2b shows an example of a communication subsystem's quality of service guarantees. This particular communication system has two ports for connecting initiators X 210 and Y 215 and one port for connecting a target Z 220. Port X 210 in turn supports two different incoming channels, port Y one incoming channel and port Z, three outgoing channels. This yields three data channels (A, B, and C) within the communications subsystem. In the present example, no quality of service guarantees have been given for channel A, again to simplify the discussion herein and also to note that sometimes certain data flows do not have guarantees. Channel B is serviced with a minimum bandwidth of 4 bytes every 4 cycles and a maximum latency of 3 cycles for each direction. Channel C is serviced with a minimum bandwidth of 4 bytes every 2 cycles and a maximum latency of 5 cycles for each direction.

A variety of techniques may be used to determine component guarantees. One technique that can be used to determine quality of service guarantees for a particular component such as a communication subsystem is described in U.S. Pat. No. 5,948,089, which is herein incorporated by reference.

In one embodiment, the resultant guarantees may be valid under all possible system conditions, i.e. the ability of the system to meet its performance requirements is given by design. In addition, in one embodiment, analysis is greatly simplified by making each of the data flows independent of one another, thus breaking the complex system analysis problem into a set of simpler data flow analysis problems.

As shown in FIG. 1, interfaces 45, 50, 55, 60, 65, 70, 75, 80 are used to tie components (both functional blocks and communications subsystems) together. In order to allow for end-to-end performance guarantees, these interfaces must be able to propagate multiple individual data flows with individual flow control on each channel. An example interface is shown in FIG. 3. Here the initiator 305 sends a request 320, potentially with write data 325, to the target 310. The target 310 replies with a response 330 and possibly also with read data 335. In order to allow multiple independent data flows to cross this interface, a channel identifier 315 is sent from the initiator 305 to the target 310 with each request, a channel identifier 332 is sent from the target to the initiator 305 with each response, and a per-data-flow flow control signal 340 is sent from target to initiator. An example of such an interface is described in PCT/US99/26901, filed Nov. 12, 1999.

Figure 4:
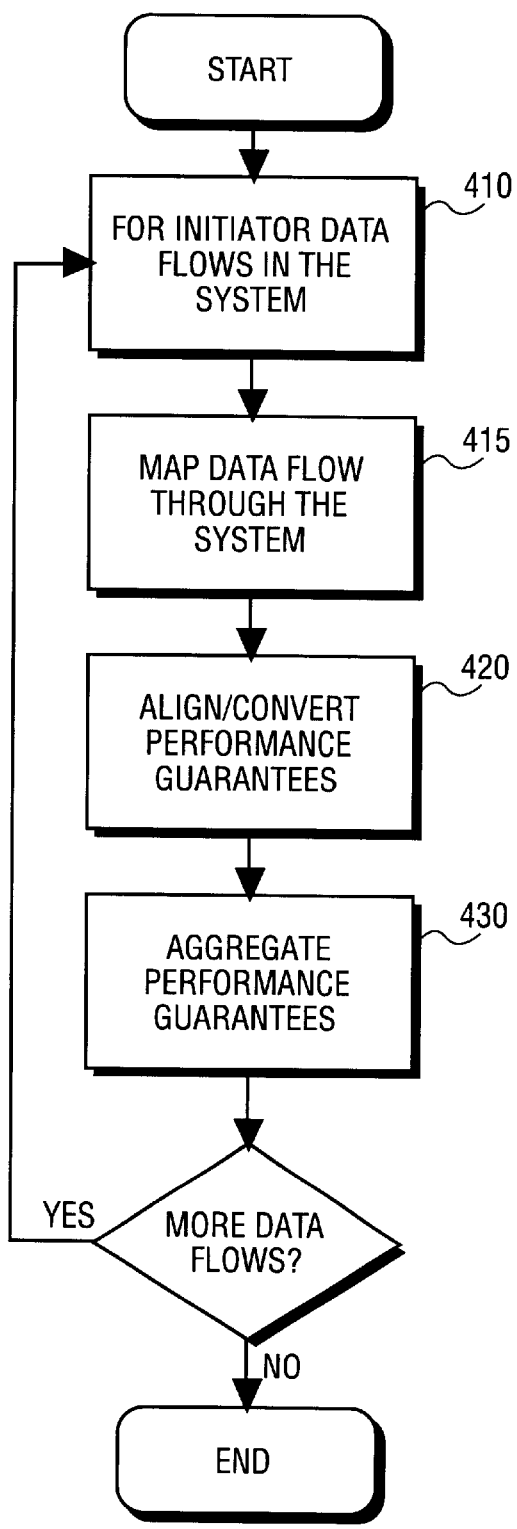
FIG. 4 shows a flowchart of the quality of service guarantee composition mechanism.

One embodiment of a process for calculating end-to-end system performance guarantees for different data flows is shown in FIG. 4. For each initiator data flow in the system 410, a mapping of the data flow through the channels of the system is first determined 415. An exemplary mapping process is further illustrated in FIG. 5 and will be discussed below.

Next, referring to FIG. 4, the parameters of the quality of service guarantees of the data channels of the components involved in this data flow are aligned to be uniform step 420. It is preferred that all guarantees be uniform in order to facilitate a global aggregation at step 430. Since different components are developed by different people and/or companies it is rare that all quality of service guarantees on all subsystems are expressed in the same units. More likely, the units have to be converted, time scales translated, or the desired quality of service guarantees derived from those given. For example, one component may specify a bandwidth guarantee in terms of Mbytes/s whereas another may specify a number of transfers/s irrespective of transfer size. This aligning process may in turn put requirements on the type of guarantees that individual components should give, in order to accomplish the aggregation process.

Once the units have been aligned along the entire data flow, the aggregate quality of service guarantees for that data flow through the entire system can be calculated step 430. The aggregation mechanism used depends on the type of parameter used to express the quality of service guarantees. For example, maximum latencies for each component are added together to give a global maximum latency. In contrast, the minimum component bandwidth guarantee along the entire path determines the minimum bandwidth service guarantee.

Figure 5:
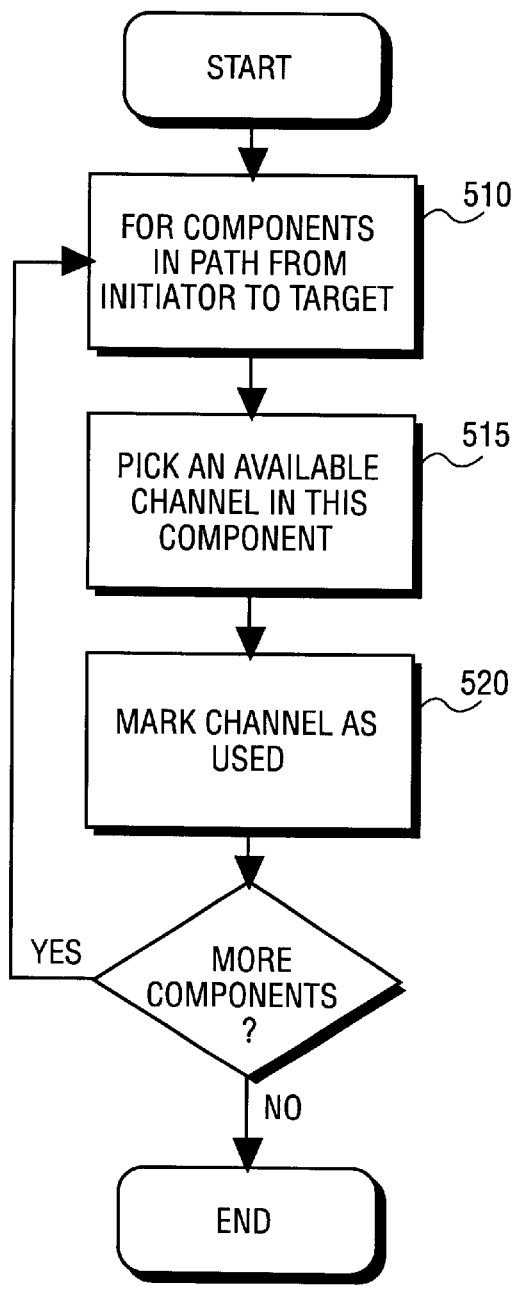
FIG. 5 shows an embodiment of a process to perform data flow mapping

FIG. 5 focuses in on one embodiment of the data flow mapping process that is part of the global mechanism shown in FIG. 4. For each component in a path from initiator to target, e.g., through several interfaces and one or more communication subsystems step 510, an available channel is chosen to carry the initiator channel step 515. Picking a particular data flow out of the set of available channels for a given component can be a complex task. Many possible ways of accomplishing the task and optimizing the overall system performance exist. For example, one could choose the channel that most closely matches the performance requirements of the initiator's data flow. It is also possible to split a data flow among multiple paths from initiator to target In the present example, it is simply assumed that a valid mapping is chosen.

Once a channel is used in a given component, it is marked as used, step 520, so that it will not be chosen for another initiator data flow. The algorithm continues until the entire data flow has been mapped from initiator to target. Note that a given component may have more channels than are required in this particular system. This is not a problem and the leftover channels are simply not used in that component. Conversely, if a component does not have enough channels to support the system, that component is not appropriate for the system and a different component should be chosen.

In addition, a component may allow multiple data flows to share a channel. In this case, the performance guarantees for a particular data flow may well depend on the characteristics of the other data flow(s), and can only be well-bounded if the initiator(s) of the other data flow(s) give guarantees about the characteristics of those data flows (such as maximum issue bandwidth).

The mapping of data flows to channels need not be a static mapping that is fixed in a system. The system may well be reconfigurable in order to adapt to different communication patterns. For example, a communication subsystem can reallocate bandwidth resources from one data channel to another to accommodate shifting data flow quality of service requirements.

In one embodiment, the system is loaded with a revised mapping and the system is reconfigured accordingly. This may be performed while the system is operating, for example, in a real time manner.

In another embodiment, reconfiguration of the system may be accomplished by the system itself providing even further flexibility and adaptability. In some embodiments, this may also be performed in a real time manner further enhancing the functionality of the system.

In one embodiment, the system is operating using at least one mapping of a data flow. In one embodiment, the aggregation of the guarantees of the selected data channels meet the application requirements. However, it is contemplated that, in one embodiment, the system may initially be operated using a first mapping that generates an aggregation that does not meet the desired guarantees. However, the system would perform the steps described herein to determine a second mapping of data flows that results in aggregate guarantees that meets the application requirements. The system may then be reconfigured according to the second mapping of data flows that meets the application requirements.

A system may also be configurable to be adaptable to different mappings that meet different application requirements, the mapping chosen based on determined criteria. Thus a system may be able to provide multiple mappings that meet the desired requirements. The particular mapping utilized may then be selected according to other criteria that may or may not relate to the desired requirements.

In some embodiments, components of a system may be replaced with other components of a different internal implementation structure. As long as the quality of service guarantees of the new components are identical to those of the replaced components, the system-wide end-to-end guarantees remain intact. Thus, such an exchange can remain transparent to the other components of the system.

Figures 6, 7:
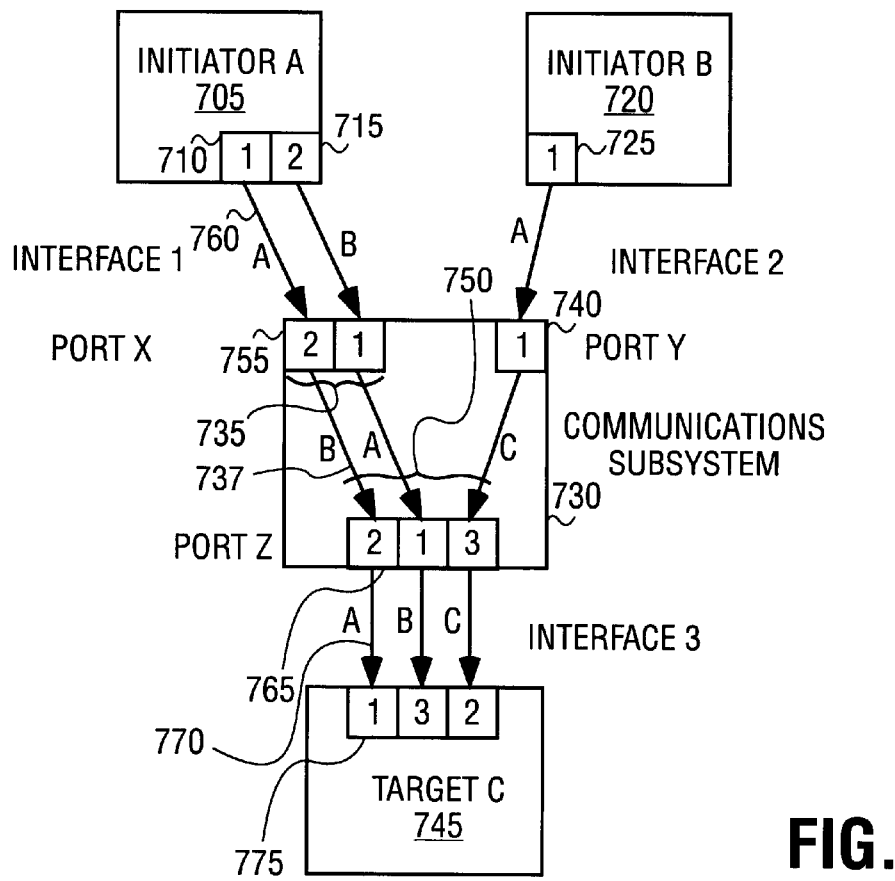
FIG. 6 shows an example of unit alignment of quality of service guarantees.
FIG. 7 shows a sample system with mapped data flows.

FIG. 6 is an example that shows how a unit translation progresses for the example functional block and communication subsystem shown in FIGS. 2a and 2b. It is assumed that the desired units are Mbytes/s for minimum bandwidth guarantees. In the present embodiment, for both the memory system and the communication subsystem, the quality of service guarantees are dependent on the size of requests issued by a particular initiator. In FIG. 6, the bandwidth guarantees of the two components for the request sizes of 4, 8 and 16 bytes are aligned. Note that the original memory system bandwidth guarantees were stated in terms of 8-byte requests per second. When smaller requests are used in the present embodiment it is conservatively assumed that the service rate does not increase. That is why the bandwidth is lower for the smaller requests.

In the communications subsystem, bandwidth guarantees were given for 4-byte requests and it is assumed that an 8 or 16-byte request can be broken down into 2 or 4 4-byte requests respectively. However, the units chosen were cycles, so the communication subsystem's operating frequency also needs to be known in order to align the bandwidth guarantees. Assuming that a 100 MHz frequency is chosen for the communications subsystem, i.e. that its cycle time is 10 ns, the resulting minimum bandwidth guarantees are 100 Mbytes/s for all request sizes of 4 bytes or above.

An example application of the quality of service aggregation mechanism using a simple system is shown in FIG. 7. An initiator A 705 sources two data flows shown as 1 710 and 2 715. A second initiator B sources only one data flow 725. The communications subsystem 730 receives the initiator data flows on ports X 735 and Y 740, respectively, and sends all of these flows to a target C 745 via port Z 750.

The first table in FIG. 8 shows one embodiment of the mapping of each initiator data flow though the system. So, for example, initiator A data flow 1 710 is sent to communications subsystem port X 735 via channel A 760 of interface 1. It traverses the communication subsystem 730 via channel B 737, exits via port Z 765, and is sent to target C 745 via interface 3 channel A 770. At target C 745 channel 1 775 is chosen to handle this data flow.

The second table of FIG. 8 shows an example of quality of service guarantees after unit alignment for the three different initiator data flows. In this example, it is assumed that initiator A flow 1 is using 4-byte requests, initiator A flow 2 is using 16-byte requests, and initiator B flow 1 is using 8-byte requests. The unit conversion and alignment is accomplished using the process described above.

The last table of FIG. 8 shows the exemplary system end-to-end quality of service guarantees for the three initiator data flows. In order to calculate the minimum bandwidth in the system for each data flow, the minimum bandwidth of each mapped data flow through each component is found. Maximum latencies are found by adding each of the component latencies along a data flow from initiator to target.

The invention has been described in conjunction with the preferred embodiment. It is evident that numerous alternatives, modifications, variations and uses will be apparent to those skilled in the art in light of the foregoing description.

What is claimed is:

1. A method for determining service guarantees for at least one data flow of a plurality of data flows between an initiator component and a target component, said method comprising:

mapping a data flow to data channels of components between an initiator component and a target component to route the data flow to the data channels;

selectively converting determined guarantees of data channels of components of the mapped data flow into common units such that the guarantees of the data channels are aligned to be uniform in the common units; and aggregating the guarantees of the data channels for the data flow.

2. The method as set forth in claim 1, wherein the mapping comprises for components in a path between an initiator device and a target device, selecting an available data channel in each component and marking the selected data channel as used.

3. The method as set forth in claim 1, wherein aggregating comprises a function selected from the group consisting of summing the guarantees of the data channels of the data flow, selecting the maximum guarantees of the data channels of the data flow, and selecting the minimum guarantees of the data channels of the data flow.

4. The method as set forth in claim 1, wherein the guarantees are selected from the group consisting of quality of service guarantees, performance guarantees, bandwidth guarantees, latency guarantees, maximum outstanding requests guarantees, and maximum variance in service latency guarantees.

5. The method as set forth in claim 1, wherein the components include at least one communication subsystem comprising a plurality of inputs and a plurality of outputs, the mapping including selecting an input of the plurality of inputs and an output of the plurality of outputs, wherein the communication subsystem can be part of a plurality of different data flows.

6. The method as set forth in claim 1, wherein different data flows between the initiator component and the target component have different guarantees.

7. A method for component selection and composition to form a data flow that provides at least one quality of service guarantee between initiator components and target components in a system, said method comprising:

mapping a data flow through selected data channels of components between an initiator component and target component to route the data flow through the selected data channels;

converting determined guarantees of the selected data channels of the mapped data flow into common units such that the guarantees of the data channels are aligned to be uniform in the common units;

aggregating the guarantees of the selected data channels; and if the aggregate guarantee does not meet a desired guarantee, modifying the mapping such that the aggregate guarantee of the selected data channels meet the desired guarantee.

8. The method as set forth in claim 7, wherein the mapping comprises for components in a path between an initiator device and a target device, selecting an available data channel in each component and marking the selected data channel as used.

9. The method as set forth in claim 7, wherein aggregating comprises a function selected from the group consisting of summing the guarantees of the data channels of the data flow, selecting the maximum guarantees of the data channels of the data flow, and selecting the minimum guarantees of the data channels of the data flow.

10. The method as set forth in claim 7, wherein the guarantees are selected from the group consisting of quality of service guarantees, performance guarantees, maximum bandwidth guarantees, minimum bandwidth guarantees, maximum latency guarantees, minimum latency guarantees, maximum outstanding requests guarantees, and maximum variance in service latency guarantees.

11. The method as set forth in claim 7, wherein the components include at least one communication subsystem comprising a plurality of inputs and a plurality of outputs, the mapping including selecting an input of the plurality of inputs and an output of the plurality of outputs, wherein the communication subsystem can be part of a plurality of different data flows.

12. The method as set forth in claim 7, wherein different data flows between the initiator component and the target component have different guarantees.

13. The method as set forth in claim 7, further comprising performing subsequent mapping, converting, aggregating and modifying while the system is operating in accordance with a first mapping.

14. The method as set forth in claim 13, wherein performing subsequent mapping, converting, aggregating and modifying is performed in real time.

15. A method for operation of a system including component selection and composition that provides at least one quality of service guarantee between initiator components and target components, said method comprising:

operating the system according to at least one first mapping of data flows through selected data channels of components between initiator components and target components, wherein a mapping routes the data flows through the selected data channels;

mapping data flows through selected data channels of components between a first initiator component and first target component to generate a second mapping of data flows;

converting determined guarantees of the selected data channels of the second mapping of data flows between a first initiator component and first target component into common units such that the guarantees of the data channels are aligned to be uniform in the common units;

aggregating the guarantees of the selected data channels;

if the aggregate guarantees do not equal the desired guarantees, modifying the second mapping of data flows such that the aggregate guarantees of the selected data channels equal the desired guarantees.

16. The method as set forth in claim 15, wherein if the aggregate guarantee meets a desired guarantee; modifying operating the system to utilize the second mapped data flow.

17. The method as set forth in claim 15, wherein the mapping comprises for components in a path between an initiator device and a target device, selecting an available data channel in each component and marking the selected data channel as used.

18. The method as set forth in claim 15, wherein aggregating comprises a function selected from the group consisting of summing the guarantees of the data channels of the data flow, selecting the maximum guarantees of the data channels of the data flow, and selecting the minimum guarantees of the data channels of the data flow.

19. The method as set forth in claim 15, wherein the guarantees are selected from the group consisting of quality of service guarantees, performance guarantees, maximum bandwidth guarantees, minimum bandwidth guarantees, maximum latency guarantees, minimum latency guarantees, maximum outstanding requests guarantees, and maximum variance in service latency guarantees.

20. The method as set forth in claim 15, wherein the components include at least one communication subsystem comprising a plurality of inputs and a plurality of outputs, the mapping including selecting an input of the plurality of inputs and an output of the plurality of outputs, wherein the communication subsystem can be part of a plurality of different data flows.

21. The method as set forth in claim 15, wherein different data flows between the initiator component and the target component have different guarantees.

22. The method as set forth in claim 15, wherein mapping, converting aggregating and modifying is performed in a real time manner.

23. A computer readable medium comprising instructions, which when executed by a processing system, performs a method for determining quality of service guarantees for at least one data flow of a plurality of data flows between an initiator component and a target component, said method comprising:

mapping a data flow to data channels of components between and initiator component and a target component to route the data flow to the data channels;

selectively converting determined guarantees of data channels of components of the mapped flow into common units such that the guarantees of the data channels are aligned to be uniform in the common units; and aggregating the guarantees of the data channels for the data flow.

24. The computer readable medium as set forth in claim 23, wherein the mapping comprises for components in path between initiator device and target device, selecting an available data channel in each component and marking the selected data channel as used.

25. The computer readable medium as set forth in claim 23, wherein aggregating comprises a function selected from the group consisting of summing the guarantees of the data channels of the data flow, selecting the maximum guarantees of the data channels of the data flow, and selecting the minimum guarantees of the data channels of the data flow.

26. The computer readable medium as set forth in claim 23, wherein the guarantees are selected from the group consisting of quality of service guarantees, performance guarantees, bandwidth guarantees, latency guarantees, maximum outstanding requests guarantees, and maximum variance in service latency guarantees.

27. The computer readable medium as set forth in claim 23, wherein the components include at least one communication subsystem comprising a plurality of inputs and a plurality of outputs, the mapping including selecting an input of the plurality of inputs and an output of the plurality of outputs, wherein the communication subsystem can be part of a plurality of different data flows.

28. The computer readable medium as set forth in claim 23, wherein different data flows between the initiator component and the target component have different guarantees.

29. A communication system comprising end to end service guarantees, the system comprising:

at least one initiator component comprising at least one data channel having a determined service guarantee;

at least one target component comprising at least one data channel having a determined service guarantee and configured to communicate a data flow with the at least one initiator component;

at least one communications subsystem component comprising at least one data channel having determined service guarantees and coupled between the initiator component and target component;

a plurality of interfaces comprising data channels and configured to couple the at least one initiator component and the at least one communications subsystem component and the at least one target component and the at least one communications subsystem component;

at least one data flow between an initiator component of the at least one initiator component and a target component of the at least one target component, the data flow routed through selected data channels of the initiator component, target component, and the at least one communication subsystem component; and a data flow guarantee for each at least one data flow, each data flow guarantee determined by selectively converting guarantees of data channels of the data flow into common units such that the guarantees of the data channels are aligned to be uniform in the common units and aggregating the aligned guarantees of the data flow.

30. The system as set forth in claim 29, wherein aggregating comprises a function selected from the group consisting of summing the guarantees of the data channels of the data flow, selecting the maximum guarantees of the data channels of the data flow, and selecting the minimum guarantees of the data channels of the data flow.

31. The system as set forth in claim 29, wherein the guarantees are selected from the group consisting of quality of service guarantees, performance guarantees, bandwidth guarantees, latency guarantees, maximum outstanding requests guarantees, and maximum variance in service latency guarantees.

32. The system as set forth in claim 29, wherein different data flows between the initiator component and the target component have different guarantees.

33. The system as set forth in claim 29, wherein the communications subsystem comprises a plurality of inputs and plurality of outputs, wherein the communication subsystem can be part of a plurality of different data flows.

34. The system as set forth in claim 29, wherein the at least one data flow comprises a subsequent data flow subsequently determined while a data flow of the system is operating in according with a data flow of the at least one data flow.

35. The system as set forth in claim 34, wherein the system is reconfigured to operate in accordance with the subsequent data flow if the data flow guarantee of the subsequent data flow meets a desired guarantee.

36. The system as set forth in claim 35, wherein the system operates in a real time manner.

* * * * *

UNITED STATES PATENT AND TRADEMARK OFFICE
CERTIFICATE OF CORRECTION

PATENT NO.   : 6,330,225 B1
DATED        : December 11, 2001
INVENTOR(S)  : Weber et al.

It is certified that error appears in the above-identified patent and that said Letters Patent is hereby corrected as shown below:

<u>Title page,</u>
Item [56], References Cited, U.S. PATENT DOCUMENTS, delete "6,216,797", insert -- US 6,215,797 B1 --.

Signed and Sealed this

Fourteenth Day of January, 2003

JAMES E. ROGAN
*Director of the United States Patent and Trademark Office*